(12) United States Patent
Hashimoto

(10) Patent No.: US 6,205,116 B1
(45) Date of Patent: Mar. 20, 2001

(54) CARTRIDGE HOUSING FORMED TO PROTECT DISK-SHAPED MEDIUM FROM DUST-PARTICLES

(75) Inventor: Gakuji Hashimoto, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/239,768

(22) Filed: Jan. 29, 1999

(30) Foreign Application Priority Data

Feb. 2, 1998 (JP) .................................................. 10-020974

(51) Int. Cl.[7] .................................................. G11B 23/03
(52) U.S. Cl. ............................................ 369/291; 360/133
(58) Field of Search .............................. 369/291; 360/133

(56) References Cited

U.S. PATENT DOCUMENTS

| 4,652,961 | 3/1987 | Dieffenbach ........................ 360/133 |
| 4,724,962 | 2/1988 | Watanabe et al. ................... 206/444 |
| 4,802,041 | * 1/1989 | Uehara ............................ 360/99.06 |
| 4,853,925 | * 8/1989 | Kaneuchi ............................ 369/291 |
| 4,943,880 | * 7/1990 | Muehlhausen et al. ............. 360/133 |
| 5,272,693 | * 12/1993 | Fujisawa ............................ 369/291 |
| 5,278,717 | 1/1994 | Sasaki et al. ........................ 360/133 |
| 5,323,382 | * 6/1994 | Takahashi .......................... 369/291 |
| 5,481,420 | 1/1996 | Cardona et al. ................. 360/99.06 |
| 5,537,389 | * 7/1996 | Kuwa et al. ........................ 369/291 |
| 5,923,641 | * 7/1999 | Fujita ................................. 369/291 |

FOREIGN PATENT DOCUMENTS

| 0077566 | 4/1983 | (EP) . |
| 2081956 | 2/1982 | (GB) . |
| 2228818 | 9/1990 | (GB) . |
| 7-006493 | 5/1995 | (JP) . |
| 8703134 | 5/1987 | (WO) . |

* cited by examiner

Primary Examiner—William Klimowicz
Assistant Examiner—Kenneth W. Fields
(74) Attorney, Agent, or Firm—Jay H. Maioli

(57) ABSTRACT

A disk-shaped information memorizing medium having as small as possible a gap formed between a cartridge housing and an opening and closing door to prevent dust from entering. To this end, an opening window is provided through one plane portion of the cartridge housing opposing an information memorizing surface of an optical disk and the opening and closing door is swung along a plane of this plane portion.

4 Claims, 15 Drawing Sheets

CARTRIDGE HOUSING FORMED TO PROTECT DISK-SHAPED MEDIUM FROM DUST-PARTICLES

BACKGROUND OF THE INVENTION

1. Field of the Invention

The present invention relates to a memorizing medium cartridge such as a disk-shaped information memorizing medium cartridge in which an information memorizing medium such as an optical disk, a magneto-optical disk and the like is accommodated in a state of rotating freely and particularly to a memorizing medium cartridge capable of effectively restraining minute dust from entering in a cartridge housing while it is in a state of being reserved.

2. Description of the Related Art

In the past, generally, as an information memorizing cartridge in whose housing an information memorizing medium capable of recording and/or reproducing information such as audio, video, computer data and the like is accommodated in a state of rotating freely, for example, a cartridge having an arrangement as shown in FIG. 1 has been known. This information memorizing cartridge is a disk cartridge 1 containing therein a write-once type magnetic disk where a user can record and write in information such as computer data and the like later on and has an outward appearance shape as shown in FIG. 1.

That is, this disk cartridge 1 comprises a cartridge housing 2 which is made up of a pair of upper and lower shells 2a and 2b, and an magneto-optical disk 4 accommodated in a state of rotating freely in a disk accommodating room 3 of this cartridge housing 2 and the like. On both surfaces of the upper and lower of the cartridge housing 2 are provided upper and lower opening windows 5 extending to one side from a central portion and this opening window 5 is made capable of being opened and closed by an opening and closing door 6 which is made capable of sliding along its one side. Then, at a central portion of the magneto-optical disk 4 is provided a hub portion 7 having a center hole 7a which is chucked to a turntable provided on a main body side of an information memorizing apparatus and this hub 7 is made to oppose a central portion of the opening window 5.

However, as the conventional disk cartridge having such an arrangement is structured such that the opening and closing door 6 is formed like a U letter shape to be fit in one side of the cartridge housing 2 and the opening window 5 is opened and closed by sliding the opening and closing door 6 along its one side, there has been a problem that a big gap forms between the cartridge housing 2 and the opening and closing door 6, thereby making it impossible to prevent the minute dust from intruding.

In this case, when the dust, which has intruded in the cartridge housing 2, attaches itself to a surface of an information memorizing surface of the magneto-optical disk 4, the read-out or write-in beam is shielded and the information memorizing surface is damaged by the dust, thereby making it impossible to carry out a read/write of information normally. Particularly, in a case of an information memorizing device with a large capacity, the effect of even minute dust can not be negligible and hence, there is a demand for a disk cartridge capable of preventing the intrusion of even the minute dust.

Further, in the above-mentioned conventional disk cartridge 1, because the opening and closing door 6 is located at a portion where it is easily touched by a user's hand, there is a fear that the user opens the opening window 5 by erroneously sliding the opening and closing door 6. Further, because the opening and closing door 6 moves linearly along one side of the cartridge housing 2, there is a problem that a surface area of the cartridge housing 2 can not be made smaller.

Also, as another example of the conventional memorizing medium cartridge, for example, there is a disk cartridge as is stated in a public bulletin of Japanese laid-open patent publication No. 7-6493. This disk cartridge comprises an upper case whose remaining half is circular-shaped and a remaining half is square-shaped, a lower case having the same shape as that of the upper case, two notch portions provided in a position which opens by 90 degrees in the circular shaped portions of the upper and lower cases when viewed from a disk center, a memorizing window provided at a center of the two notch portions of the lower case, a swinging shutter which covers the notch portions and the memorizing window and is fit in the circular portions of the upper and lower cases and a driven roller provided in a position symmetrical to the notch portions relative to the disk center in the upper and lower cases.

Although this disk cartridge is arranged such that the swinging shutter moves curvedly in the circular portion of the upper and lower cases, because the swinging shutter is formed in the same U letter shape as the above-mentioned opening and closing door 6 and this swinging shutter is so structured to fit in the circular portions of the upper and lower cases, a large gap similarly forms between the upper and lower cases and the swinging shutter, thereby giving birth to the problem that minute dust can not be prevented from intruding.

SUMMARY OF THE INVENTION

The present invention is implemented in view of these problems with the conventional disk cartridge and its object is to solve the above-mentioned problems by putting in place an arrangement that an opening window is provided on at least one plane portion of the cartridge housing as well as by swinging the opening and closing door along the plane of this plane portion to carry out a measure against the dust for reducing as small as possible the gap which forms between the cartridge housing and the opening and closing door.

According to an aspect of the present invention, there is proposed a disk-shaped information memorizing medium cartridge which comprises:

a cartridge housing in which a disk-shaped information memorizing medium accommodating room is formed by superposing a pair of shells;

a disk-shaped information memorizing medium accommodated capable of rotating freely in the disk-shaped information memorizing medium accommodating room;

an opening window formed in one shell of the pair of shells, and which exposes an information memorizing surface of the disk-shaped information memorizing medium; and an opening and closing door which is installed in one shell of the pair of shells to be capable of swinging freely and opens and closes the opening window by its swinging with a plane of one shell of the pair of shells as a guide, wherein the plane of the one shell is substantially parallel to the information memorizing surface of the disk-shaped information memorizing medium rotatabley accommodated in the disk-shaped information memorizing medium accommodating room.

Since the present invention is arranged in the above-mentioned manner, the opening and closing door is swung along the plane of the plane portion on which the opening window of the cartridge housing is provided, whereby it is possible to reduce the gap formed between the cartridge housing and the opening and closing door as small as possible and to effectively restrain intrusion of the minute dust into the cartridge housing when it is in a state of being reserved.

DESCRIPTION OF THE PREFERRED EMBODIMENTS

Figure 1:
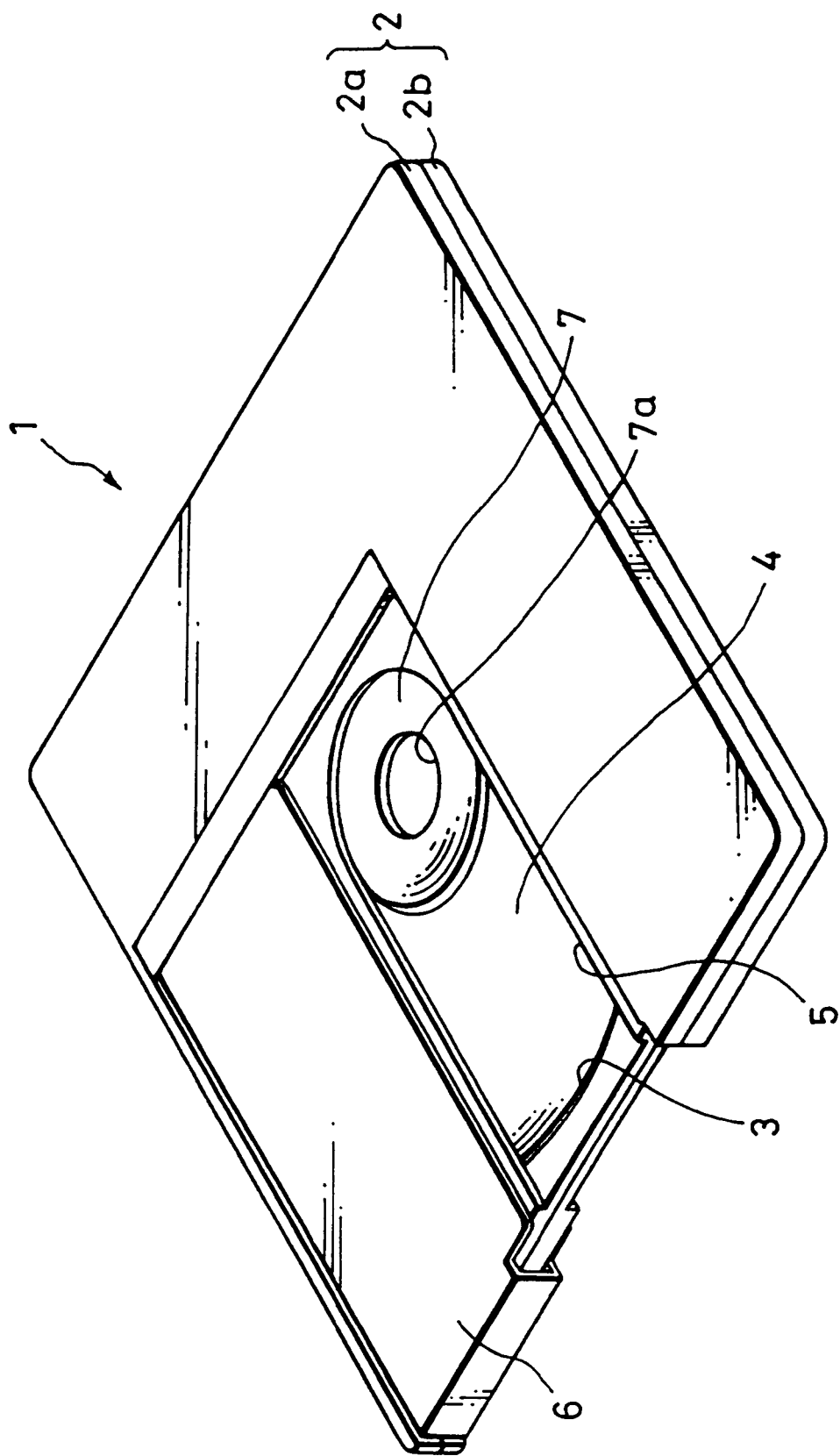
FIG. 1 is a perspective view showing a conventional disk cartridge.
Figure 2:
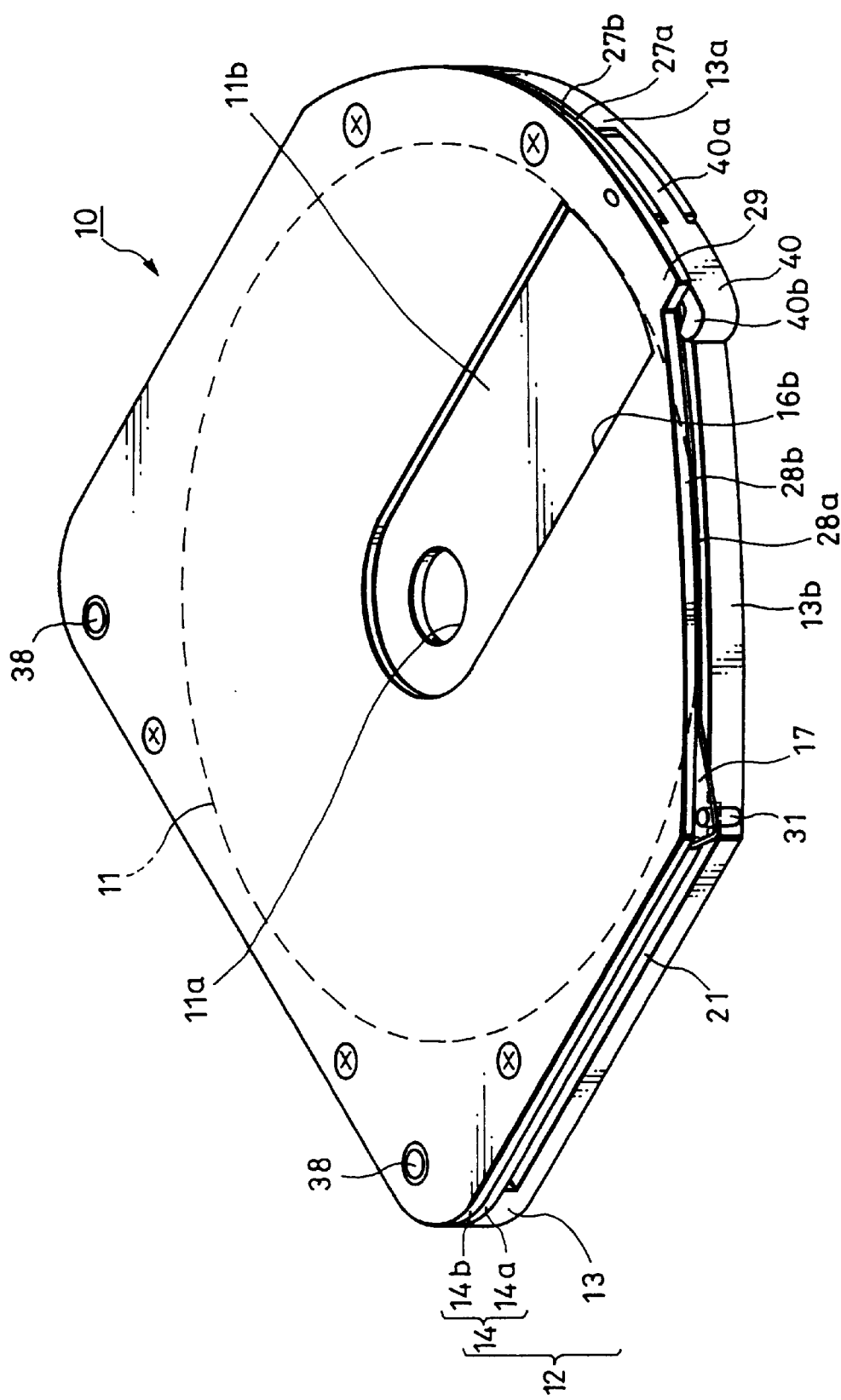
FIG. 2 is a perspective view of a disk cartridge showing an example of a first embodiment of a disk-shaped information memorizing medium cartridge of the present invention with an opening window being in an opened state and seen from a lower surface side thereof.
Figure 3:
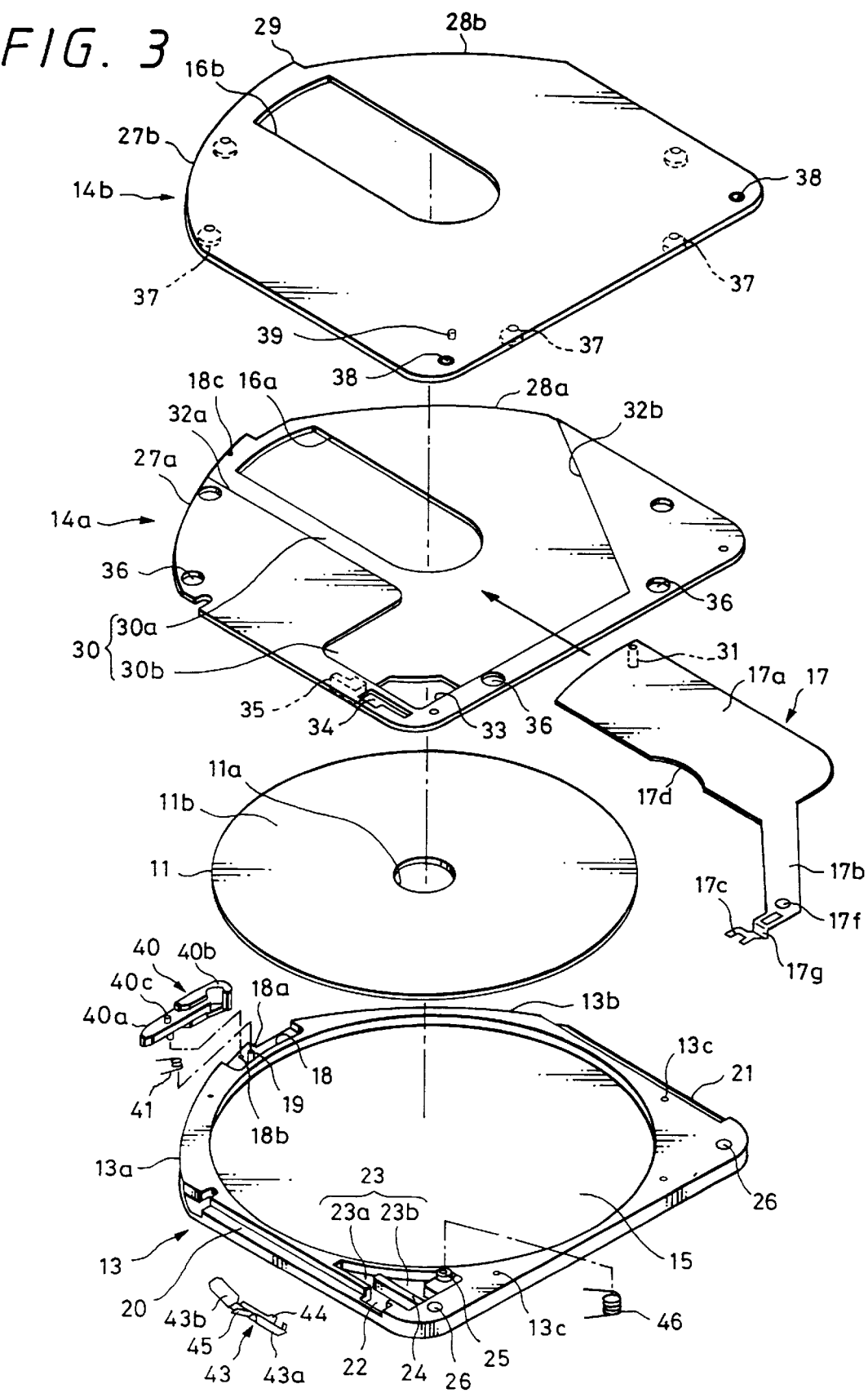
FIG. 3 is an exploded perspective view of the disk cartridge shown in FIG. 2 in a state seen from the lower surface side thereof.
Figure 4:
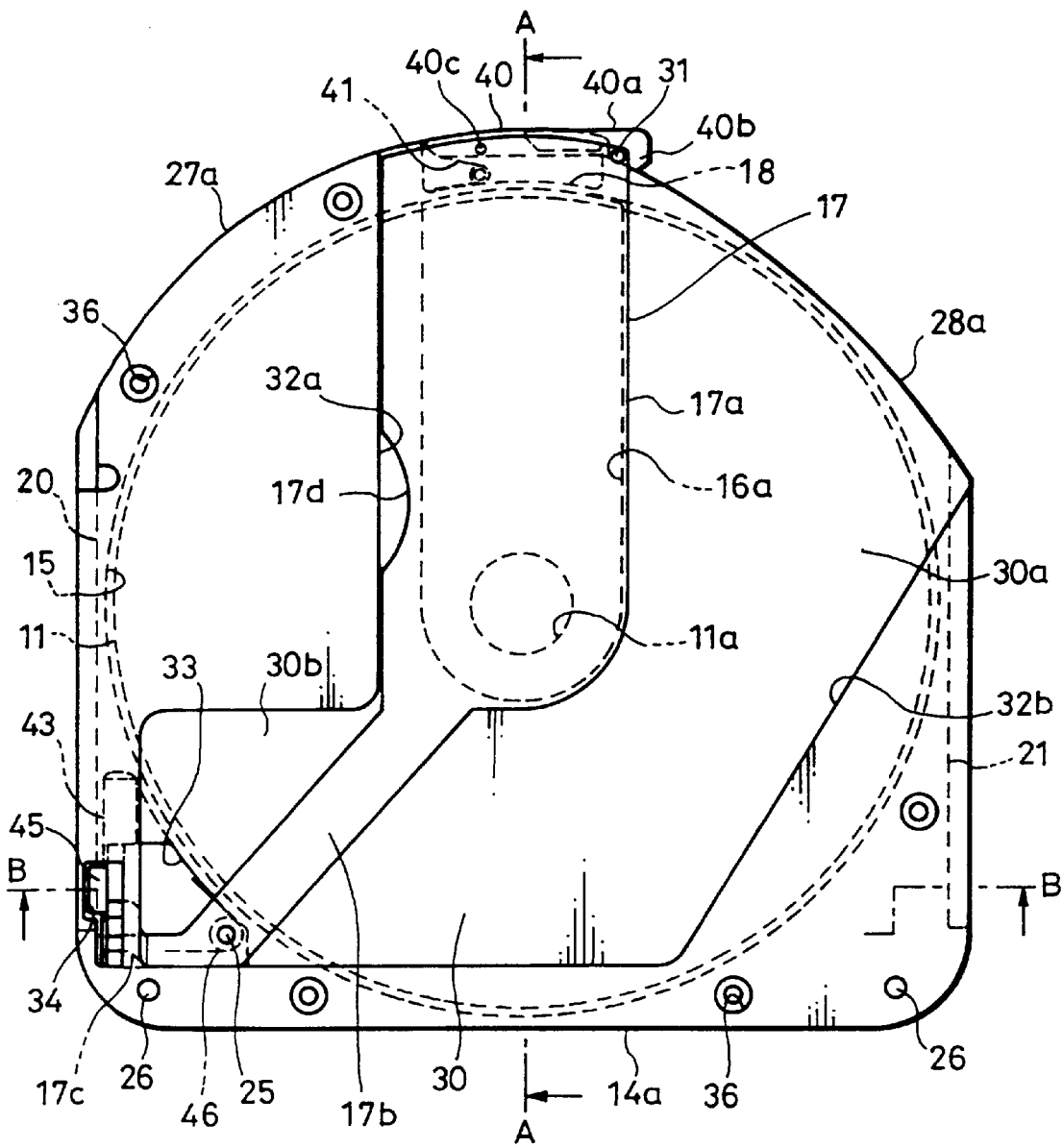
FIG. 4 is a plan view of the disk cartridge shown in FIG. 2 in a state in which a lower shell plate is removed and the opening window is closed.
Figure 5:
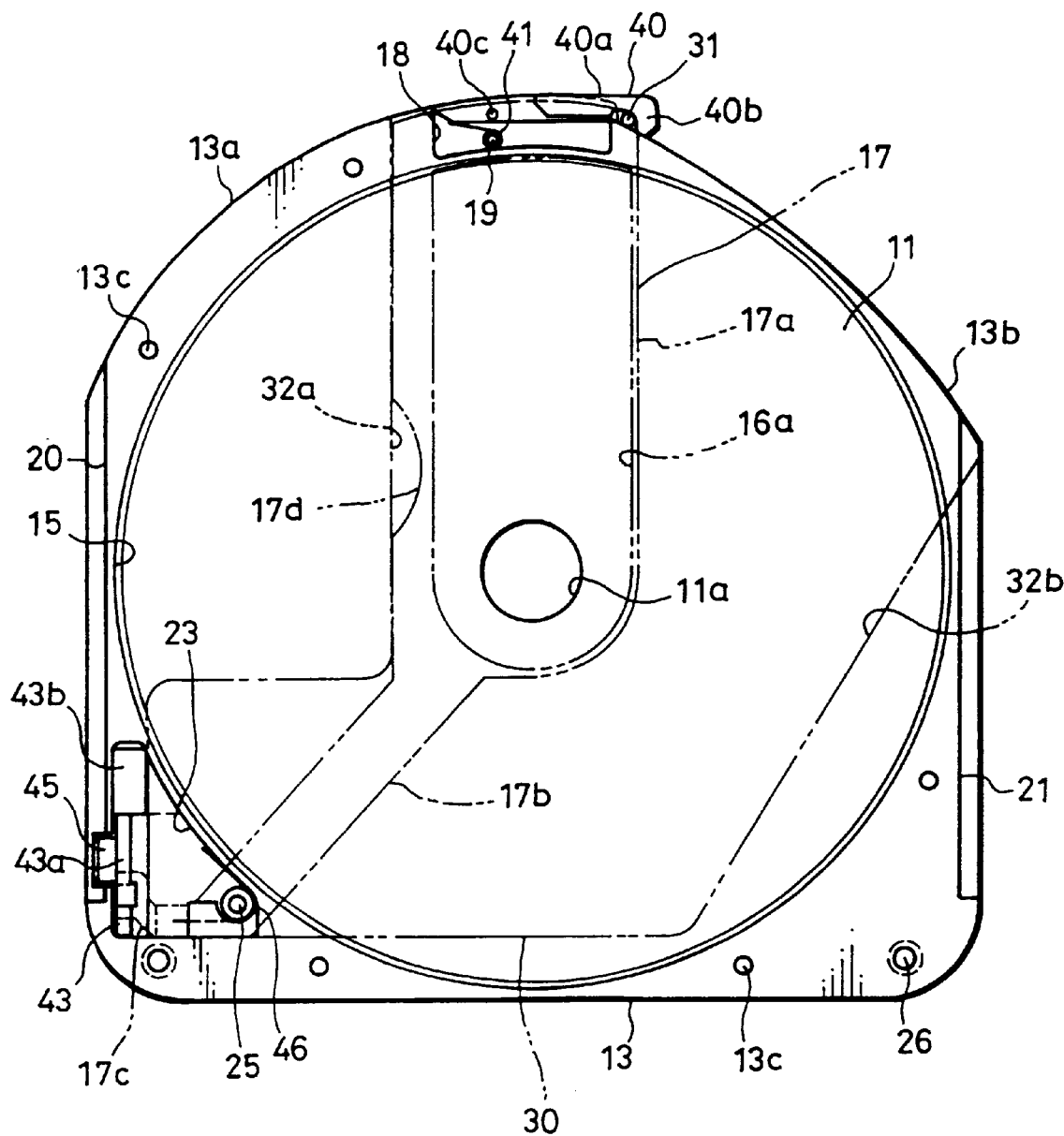
FIG. 5 is a plan view of the disk cartridge shown in FIG. 2 in a state in which an upper shell plate is further removed and the opening window is closed.
Figure 6:
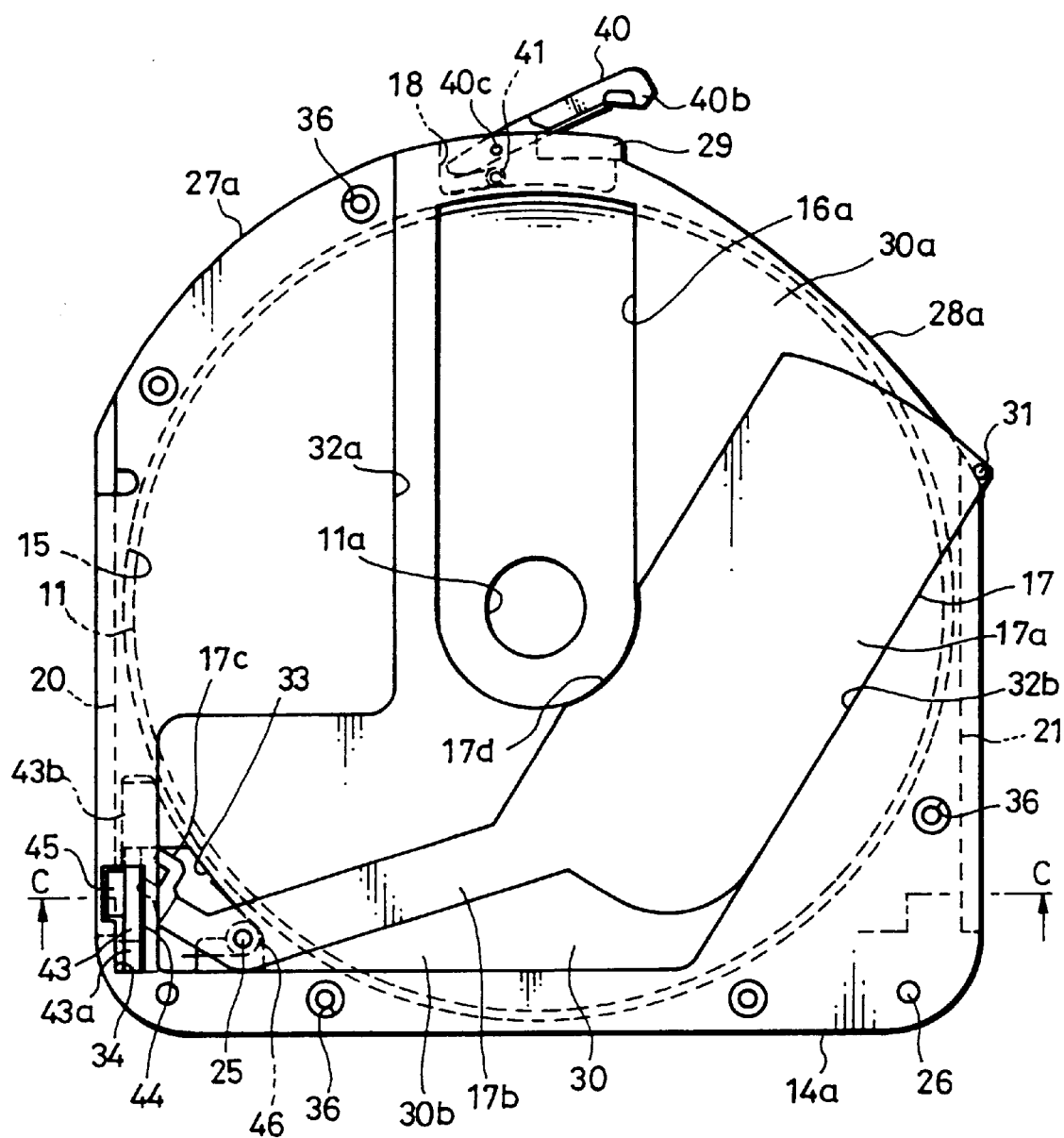
FIG. 6 is a plan view of the disk cartridge shown in FIG. 2 in a state in which the lower shell plate is removed and the opening window is opened.
Figure 7:
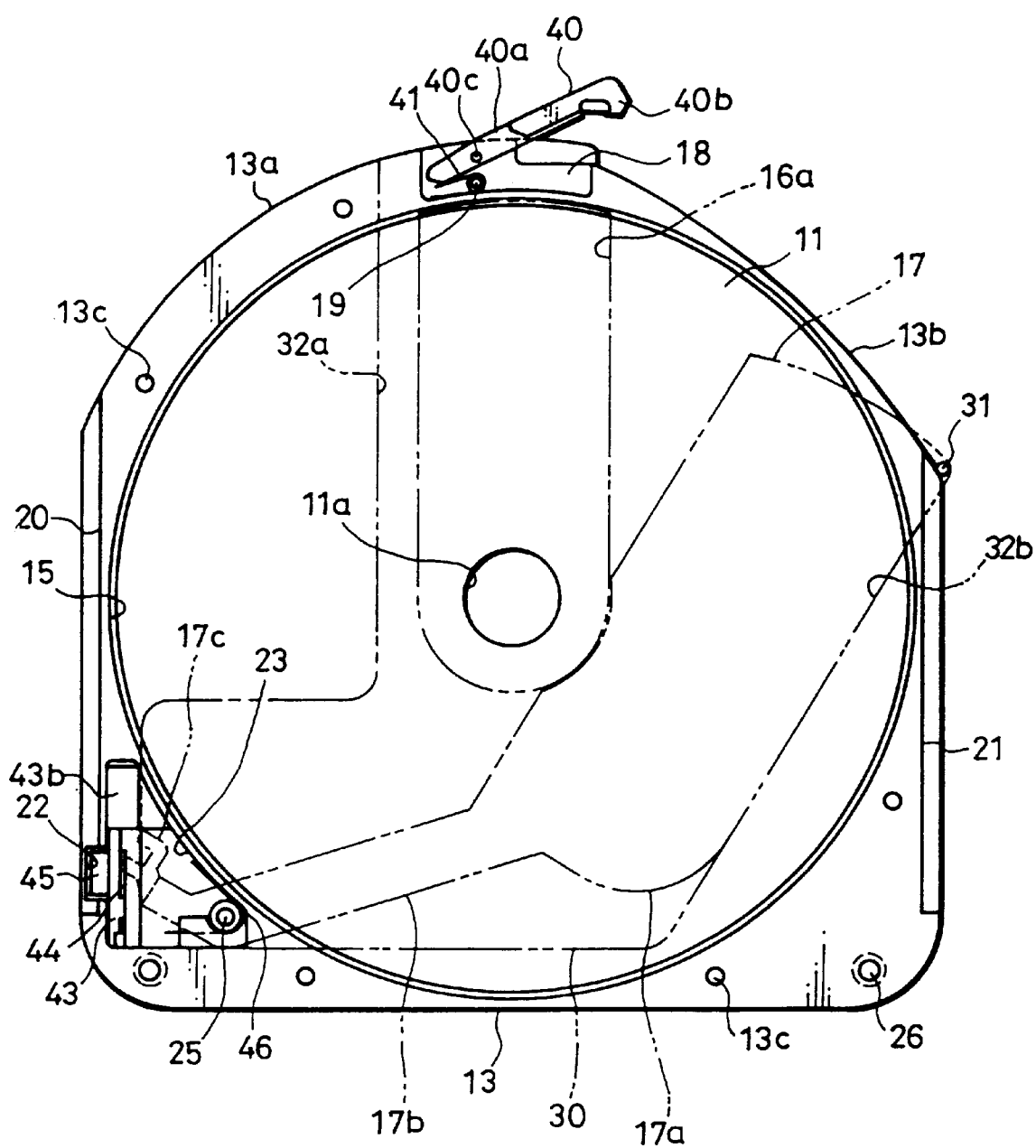
FIG. 7 is a plan view of the disk cartridge shown in FIG. 2 in a state in which the upper shell plate is further removed and the opening window is opened.
Figure 8:
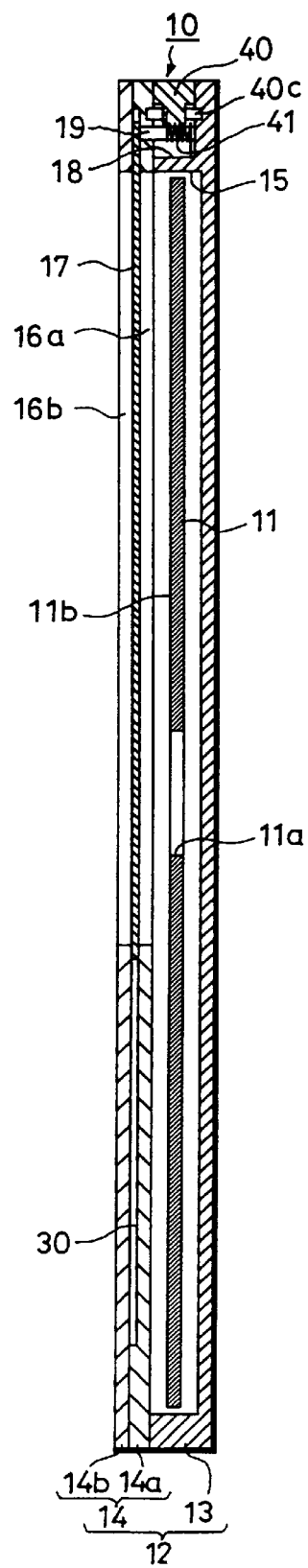
FIG. 8 is an enlarged cross-sectional view of the disk cartridge shown in FIG. 2 taken on line A—A in FIG. 4.
Figure 9:
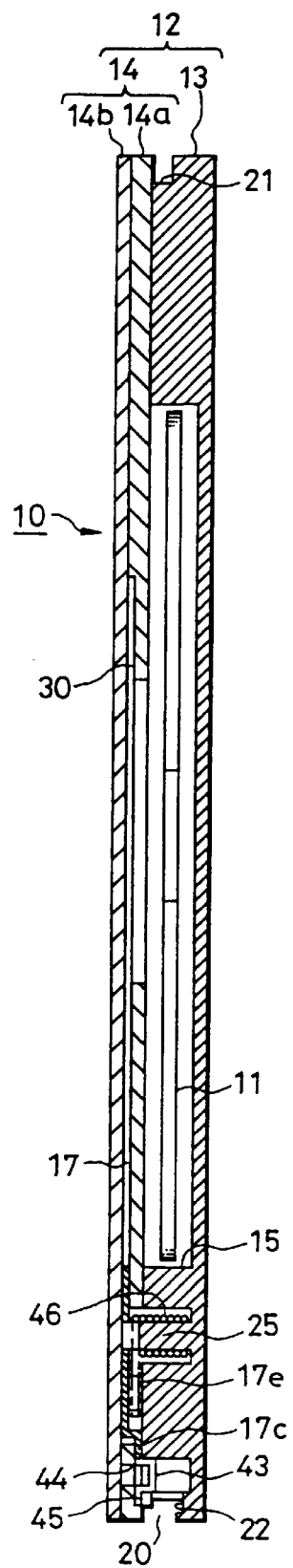
FIG. 9 is an enlarged cross-sectional view of the disk cartridge shown in FIG. 2 taken on line B—B in FIG. 4.
Figure 10:
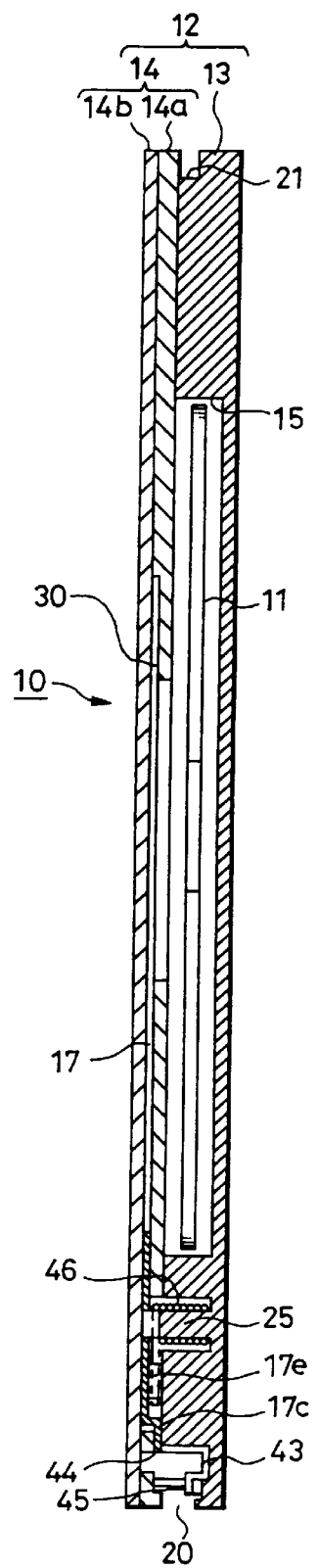
FIG. 10 is an enlarged cross-sectional view of the disk cartridge shown in FIG. 2 taken on line C—C in FIG. 6.
Figure 11:
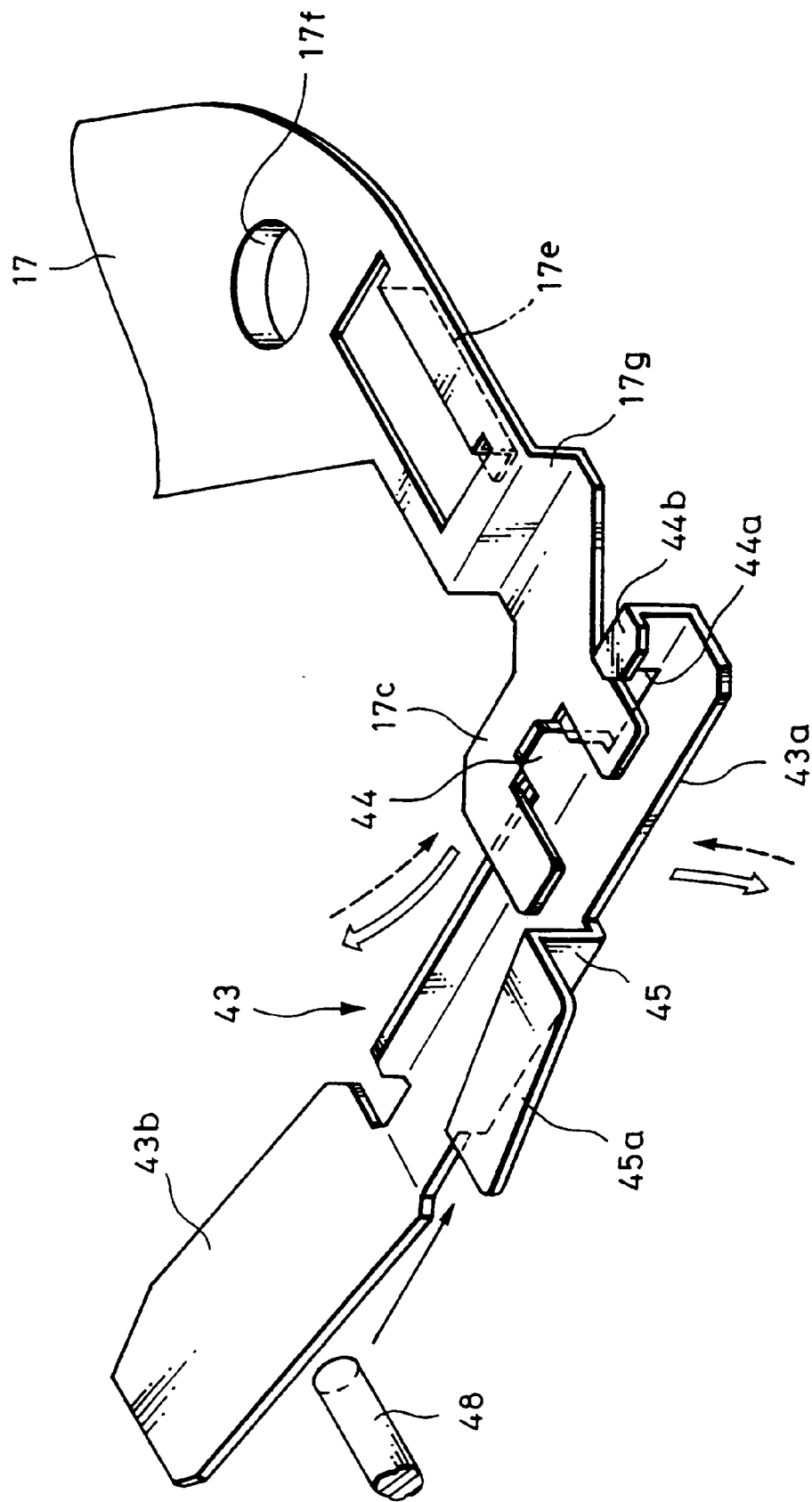
FIG. 11 is a perspective view showing a second locking mechanism of the disk cartridge shown in FIG. 2 in an enlarged scale.

Hereafter, embodiments of the present invention will be explained with reference to the attached drawings. FIG. 2 through FIG. 11 show a first embodiment of the present invention in which FIG. 2 is a perspective view of a disk cartridge such as a disk-shaped information memorizing medium cartridge when looked at from a lower surface side, FIG. 3 is an exploded perspective view of the disk cartridge, FIG. 4 is a plan view of the disk cartridge when an opening and closing door is closed at a time of a lower shell plate being removed, FIG. 5 is a plan view of the disk cartridge when the opening and closing door is closed at a time of an upper shell being further removed, FIG. 6 is a plan view of the disk cartridge when the opening and closing door is opened at a time of the lower shell plate being removed, FIG. 7 is a plan view of the disk cartridge when the opening and closing door is opened at a time of the upper shell being further removed, FIG. 8 is an enlarged sectional view taken on line A—A of FIG. 4, FIG. 9 is an enlarged sectional view taken on line B—B of FIG. 4, FIG. 10 is an enlarged sectional view taken on line C—C of FIG. 6 and FIG. 11 is a perspective view showing a second lock mechanism in an enlarged scale.

Figure 12:
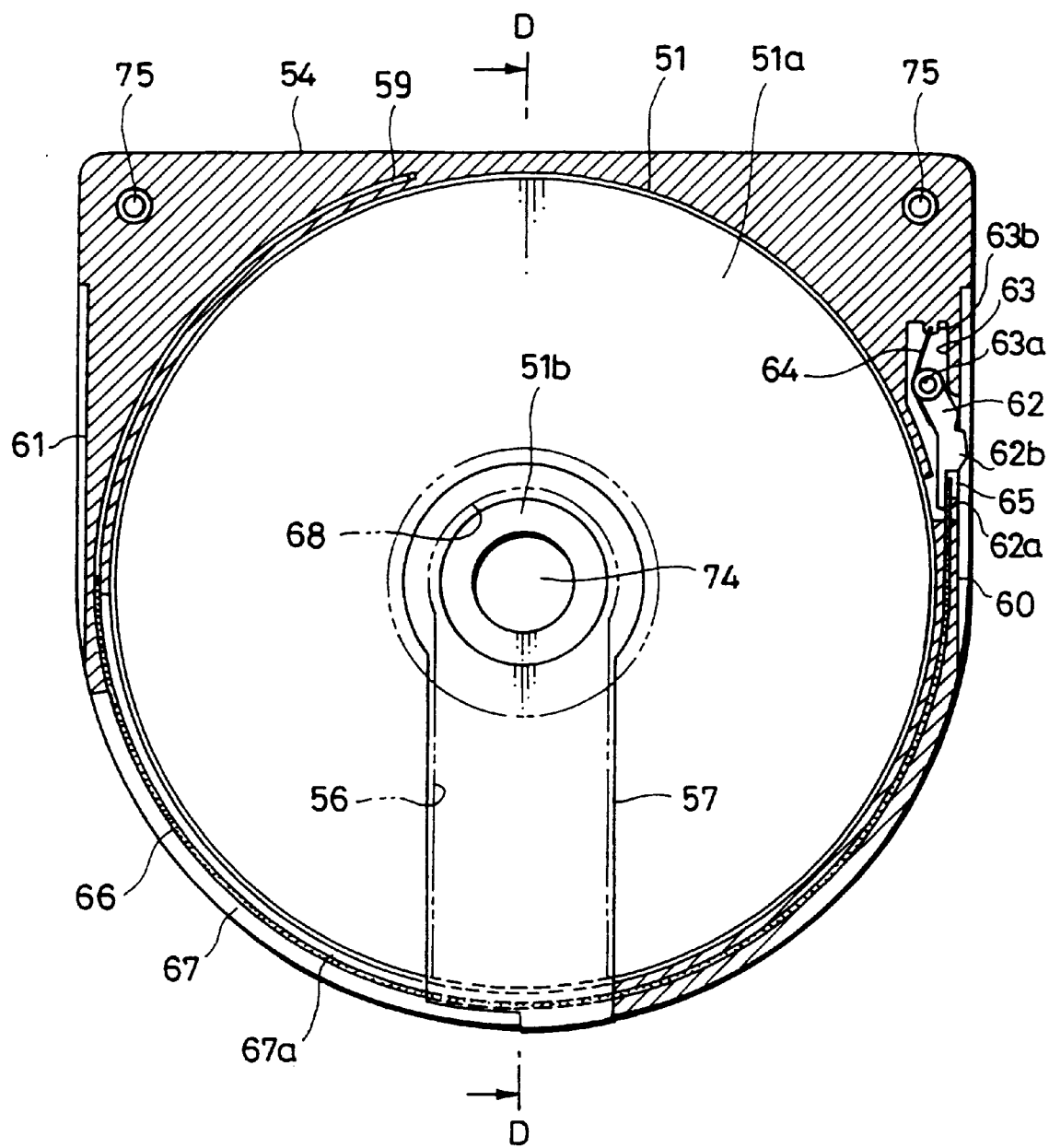
FIG. 12 is a plan view of the disk cartridge showing a second embodiment of the disk-shaped information memorizing medium cartridge of the present invention in a state in which the lower shell plate thereof is sectioned and the opening window is closed.
Figure 13:
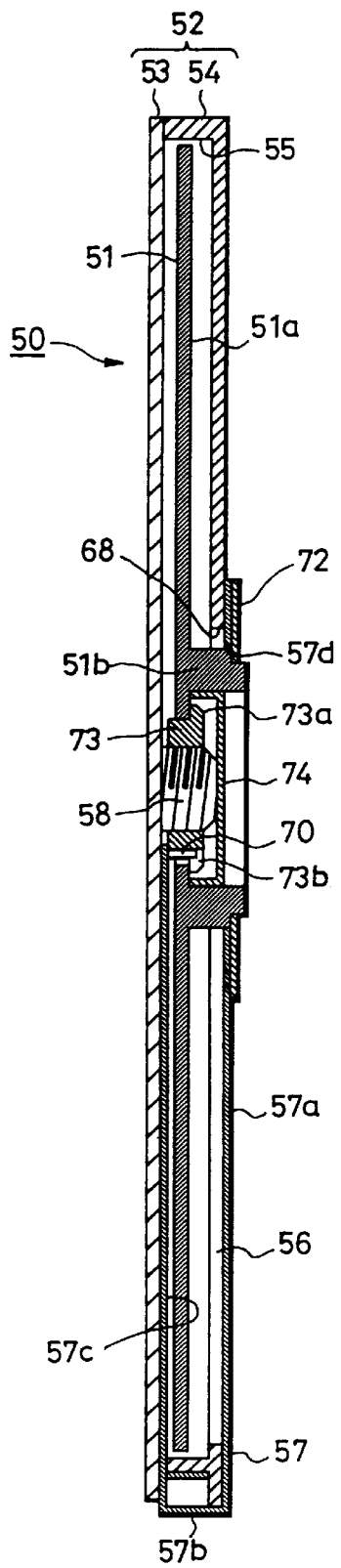
FIG. 13 is an enlarged cross-sectional view of the disk cartridge shown in FIG. 12 taken on line D—D.
Figure 14:
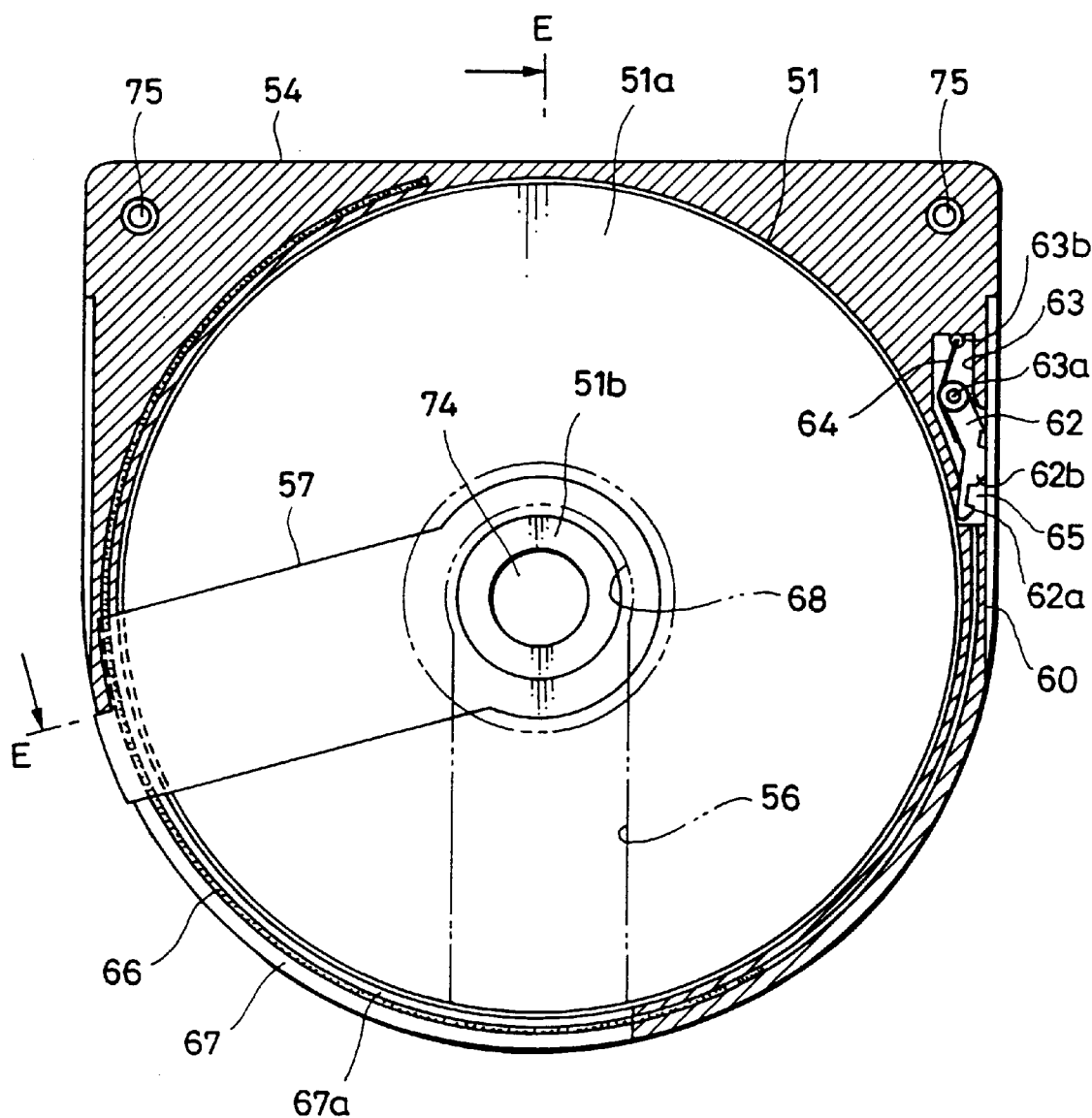
FIG. 14 is a plan view of the disk cartridge shown in FIG. 12 in a state in which the lower shell plate is sectioned and the opening window is opened.
Figure 15:
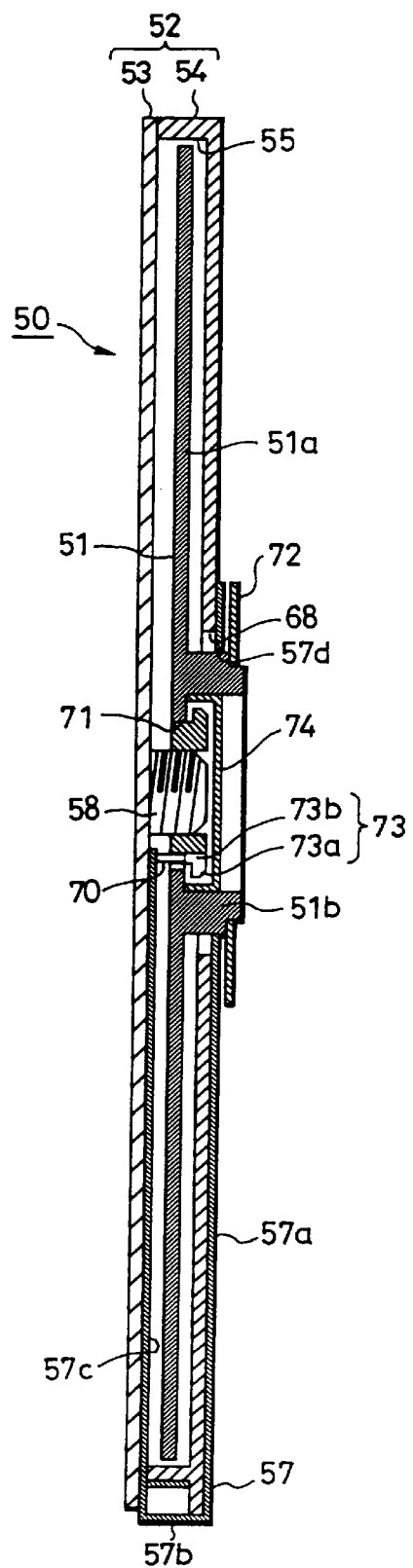
FIG. 15 is an enlarged cross-sectional view of the disk cartridge shown in FIG. 12 taken on line D—D in FIG. 14.

Also, FIG. 12 through FIG. 15 show a second embodiment of the present invention in which FIG. 12 is a plan side sectional view of the disk cartridge when the opening and closing door is closed at a time of one shell being removed, FIG. 13 is an enlarged sectional view taken on line D—D of FIG. 12, FIG. 14 is a plan side sectional view of the disk cartridge when the opening and closing door is opened at a time of one shell being removed and FIG. 15 is an enlarged sectional view taken on line E—E of FIG. 14.

A disk cartridge 10 pertaining to the first embodiment showing one concrete example of a disk-shaped information memorizing medium cartridge is one which uses a recording and reproducing optical disk 11 as one concrete example of an information memorizing medium. With a lower surface side being upward as shown in FIG. 2 and FIG. 3, this disk cartridge 10 comprises a cartridge housing 12 which is formed by superposing a pair of an upper shell 13 and an lower shell 14, the optical disk 11 accommodated in a state of rotating freely in a disk accommodating room 15 formed in the cartridge housing 12, an opening and closing door 17 capable of opening and closing an opening window 16 formed in the lower shell 14 and the like.

The upper shell 13 is nearly half circular shaped in its front half and nearly square shaped in its back half, and is made up of a plate-state body and in its inside is provided the disk accommodating room 15 made up of a circular cave-in portion. The front-half of the upper shell 13 is made up of, as shown in FIG. 4 through FIG. 7, a middle center arc portion 13a provided on one side of a nearly middle portion in a width direction which orthogonally intersects a front to back direction and a rear center arc portion 13b provided on the other side of the nearly middle portion in the same width direction. There is an arrangement such that an arc center of the front-half middle center arc portion 13a of the upper shell 13 is set at a nearly central portion of the disk accommodating room 15 and an arc center of the rear center arc portion 13b is set in the neighborhood of a back corner portion of a back half, and a lock pin, which will be mentioned later, of the opening and closing door 17 is guided by the rear center arc portion 13b.

Further, in the front-half center portion of the upper shell 13 is provided a concave portion 18 which extends from the middle center arc portion 13a to the rear center arc portion 13b, and a step portion 18a is set at a tip end portion of the concave portion 18 on a rear center arc portion 13b side. Then, a spring support pin 19 is provided on a middle center arc portion 13a side of the concave portion 18 and a pin support hole 18b is provided outside this spring support pin 19. Further, guide channels 20 and 21 which play roles of positioning, preventing an erroneous insertion and the like upon being loaded on a disk recording and reproducing apparatus are provided extending in a front to rear direction on both side surface portions in the widewise direction of the upper shell 13.

These guide channels 20 and 21 have one end opened respectively in the middle center arc portion 13a and the rear center arc portion 13b and the other end extended in the neighborhood of a rear portion of the rear half. Then, in the neighborhood of the rear portion of the guide channel 20 is provided a connection concave portion 22. This connection concave portion 22 is connected to a cave-in portion 23 provided in one corner portion of a rear portion in the rear half of the upper shell 13. This cave-in portion 23 is partitioned into an outer concave portion 23a and an inside concave portion 23b by a partition-shaped stripe body and a protruding shaft 25 is projectingly provided in the inside concave portion 23b. Then, in the circumference of the disk accommodating room 15, a plurality of screws 13c are provided for screwing the lower shell 14 which is superposed thereon. Further, a pair of positioning holes 26 for positioning this disk cartridge 10 in a predetermined position of a disk recording and reproducing apparatus are provided in both corner portions of the rear portion of the rear half of the upper shell 13.

The optical disk 11 to be accommodated in the disk accommodating room 15 of the upper shell 13 consists of a thin disc shaped member with a center hole 11a provided in the central portion, and on one surface of its plane portion, provided is an information memorizing surface 11b capable of memorizing information, which an optical head of an optical pick-up apparatus built in the disk recording and reproducing apparatus opposes. A turn table of a disk rotation driving apparatus built in the disk recording and reproducing apparatus is fit in the center hole 11a, and the optical disk 11 is chucked by the turn table and driven into rotation in one body.

As for materials for this optical disk 11, for example, synthetic resin such as polycarbonate (PC), polyolefin and the like are suitable, but it is possible to use not only other synthetic resin but also various kinds of other materials such as glass material, aluminum alloy and the like other than the synthetic resin, which are used as an information memorizing medium.

Also, the lower shell 14 is made up of an upper shell plate 14a and a lower shell plate 14b. The upper and lower shell plates 14a and 14b are of nearly the same shape as the upper shell 13 as shown in FIG. 3, and each of front halves thereof is nearly half circular shaped and each of rear halves thereof is made up of a plate body as a plane portion forming nearly a square shape. Then, middle center arc portions 27a and 27b are provided on one sides of nearly middle portions in front halves of the respective shells 14a and 14b and, rear center arc portions 28a and 28b are similarly provided on the other side. Then, a stopper portion 29 protruding by a predetermined amount to the rear center arc portion from an edge portion of the middle center arc portion 27b is provided at a nearly middle portion in the front half of the lower shell plate 14b. This stopper portion 29 stops a lock pin of the opening and closing door 17 and limits its rotation amount.

Further, opening windows 16a and 16b which correspond to each other in an up to down direction when they are superposed are provided in the upper and lower shells 14a and 14b, respectively. These opening windows 16a and 16b are each made up of an oblong aperture state opening portion with a predetermined width, which extends linearly in a front to back direction with one end set in a nearly middle portion and the other end set in the neighborhood of a nearly middle portion in the front half. Then, a door accommodating concave portion 30 in which the opening and closing door 17 is accommodated in a state of rotating freely is provided on one surface of the upper shell plate 14 in relation to the upper opening window 16a. This door accommodating concave portion 30 is so arranged as to correspond to a form in which the opening and closing window 17 swingingly shifts its position by a predetermined angle in order to open as well as close the opening windows 16a and 16b.

Prior to explaining a form of this door accommodating concave portion 30, first of all, the opening and closing door 17 will be explained. This opening and closing door 17, as shown in FIG. 3, comprises a rectangular shaped shutter piece 17a capable of completely closing the opening doors 16a and 16b, an arm piece 17b contiguous to one side of the shutter piece 17a in a longitudinal direction and a lock nail 17c provided contiguous to a tip end portion of this opening and closing door 17b. In an outside edge portion of the shutter piece 17a is provided a lock pin 31 projecting to its one surface side and this lock pin 31 is made to slidably come into contact with the above-mentioned rear center arc portions 13b, 28a and 28b. At an inner side of this shutter piece 17a, an arc shaped escape portion 17d is provided for preventing the shutter piece 17a from overlapping with the opening windows 16a and 16b when the opening windows 16a and 16b are in a state of being opened.

Further, the arm piece 17b of the opening and closing door 17 is provided by being extended in a direction which forms a diagonal line to the corner portion whereat the lock pin 31 of the shutter piece 17a is fixed. Then, as shown in FIG. 11, at a tip end portion of the arm piece 17, its one part is bent down forward to form a spring receiving tab 17e, and at a position a little returning toward the shutter piece 17a side from the spring receiving tab 17e of the arm piece 17b, a swinging hole 17f, which is a center of a swinging operation of the opening and closing door 17, is provided. The projecting shaft 25 of the upper shell 13 is fit in this swinging hole 17f capable of swinging freely. Also, the lock nail 17c of the opening and closing door 17 is made up of a U letter shaped member having nail tabs in a front to back direction, and a position of the lock nail 17c in terms of height is adjusted by providing a step portion 17g between the tip portion of the arm piece 17b and the lock nail 17c.

The door accommodating concave portion 30 in which the opening and closing door 17 having such the form is accommodated comprises a shutter moving portion 30a forming nearly a fan shape corresponding to a moving configuration of the shutter piece 17a and an arm moving portion 30b allowing the moving of the arm piece 17b. A concave portion side edge 32a positioned on one side of the shutter moving portion 30a of this door accommodating concave portion 30 extends straight in a front to back direction with a predetermined distance from one side edge of the opening window 16a. Then, as shown in FIG. 4 and FIG. 5, when one side edge of the opening and closing door 17 is in contact with the concave portion side edge 32a, the opening widows 16a and 16b are completely closed by the shutter piece 17a.

Also, a concave portion side edge 32b positioned on the other side of the shutter moving portion 30a of the door accommodating concave portion 30 is so set as to slantly extend in a forward direction from a position which is swung by a predetermined angle from the other side edge of the opening window 16a. As a result, as shown in FIG. 6 and FIG. 7, when the other side edge of the opening and closing door 17 is in contact with the concave portion side edge 32b, the shutter piece 17a having the escape portion 17d can completely open the opening window 16a and 16b.

Further, in a corner portion opposing in a diagonal direction the rear portion center arc portion 28a of the arm moving portion 30b of the door accommodating concave portion 30, a first opening aperture 33 to expose a part of the cave-in portion 23 and a second opening aperture 34 which is set at an outside of a widewise direction of this first opening aperture 34 are provided. The second aperture 34 is to expose a part of an elastic member, which will be explained later and is so formed as to correspond to the connection concave portion 22 of the upper shell 14a. Then, on a front side of the second opening aperture 34 of the upper shell 14a, a block portion 35 projecting toward the upper shell 13 side is provided. This block portion 35 is fit in a part of the outer concave portion 23a of the upper shell 13 and as a result, it is possible to carry out an approximate positioning of the upper shell plate 14a relative to the upper shell 13.

On an outside of the door accommodating concave portion of this upper shell 13 are provided a plurality of positioning fit-in holes 36 and respective fit-in holes 36 are set respectively at positions corresponding to screw holes 13c of the upper shell 13. Then, a plurality of fit-in convex portions 37, which are to be fit in these fit-in holes 36, are provided by the same number on the inner surface of the lower shell plate 14b. By only fitting the fit-in convex portions 37 in the fit-in holes 36 and superposing the upper and lower shells plates 14a and 14b, positioning of both the shell plates 14a and 14b can be carried out. Then, by engaging its tip portion in screw portion 13c after inserting a shaft portion of set screws through these, it becomes possible to make up the cartridge housing 12 by integrally assembling the upper and lower shells 13 and 14.

Further, in the neighborhood of both the corner portions in the rear half of the upper shell plate 14a, a pair of positioning holes 38 for positioning the disk cartridge 10 at a predetermined position in the disk recording and reproducing apparatus are provided. Then, in the neighborhood of one positioning hole 38, a projection 39 fit in the central portion of the projecting shaft 25 which has penetrated the first opening hole 33 is provided.

Also, in the concave portion 18 of the upper shell 13 is installed a lock arm 40 capable of swinging freely. This lock arm 40 comprises: a rod shaped arm main body 40a, a lock nail 40b provided at one end in a longitudinal direction of this arm main body 40a and a swinging pin 40c which is provided on an opposite side of the lock nail 40b of the arm main body 40a and at the same time, its both ends project sideward. Then, one end of the swinging pin 40c is fit in the pin supporting hole 18b of the upper shell 13 capable of swinging freely and the other end thereof is fit in the pin supporting hole 18b provided in the upper shell plate 14a capable of swinging freely, whereby the lock arm 40 is pivotally supported in the cartridge housing 12 capable of swinging freely.

One end of a torsion spring 41 showing one concrete example of the elastic body is urged toward the inner surface of the lock arm 40. A coil portion of this torsion spring 41 is loosely fit in the spring supporting pin 19 and the other end thereof is urged toward a bottom surface of the terraced portion 18. The lock nail 40b of the lock arm 40 is always urged toward the terraced portion 18 by a spring force of the torsion spring 41. A first lock mechanism for locking the opening and closing door 17 is made up of this lock arm 40 and the torsion spring 41.

Also, in the outer concave portion 23a of the upper shell 13 is accommodated a plate spring body 43 showing one example of the elastic member. This plate spring body 43, as enlargedly shown in FIG. 11, comprises; a thin and long spring main body 43a, an elastic piece 43b which is formed by bending a little one longitudinal end portion of the spring main body 43a toward a surface direction, and a lock tab 44 and an input tab 45 which are formed so as to stand upright in the same direction by bending in a widewise direction both end edges on a side opposite to the elastic tab 43b of the spring main body 43a.

The lock tab 44 of this spring main body 43a is provided with a notch 44a reaching a bottom portion of the spring main body 43a and an engagingly stopping tab 44b is set at an outside of the lock tab 44 by the notch 44a. An elastic tab 43b side of the lock tab 44 is made an inclining surface and along the inclining surface, the lock nail 17c of the opening and closing door 17 moves to a surface direction of the optical disk 11, thereby making it possible to take a locked state shown in FIG. 4, FIG. 11 and the like as well as an unlocked state shown in FIG. 6 and the like.

Also, the input tab 45 of the plate spring body 43 is formed like a L letter shape in cross-section and on its upper surface is provided with an inclining plane 45a gradually descending forward toward the elastic tab 43b side. This input tab 45 is supposed to become an input portion for mounting and demounting of the lock nail 17c by the lock tab 44 by elastically deforming the plate spring body 43, and an operating pin 48 provided in the disk recording and reproducing apparatus slides on the inclining plane 45a. By this, an engagingly stopping tab 44b side of the spring main body 43a is pushed downward with a result that the lock tab 44 escapes downward, thereby releasing locking of the lock nail 17c. A second lock mechanism for locking the opening and closing door 17 is made up of this plate spring body 43.

The opening and closing door 17, which is doubly locked by the first and second lock mechanisms in this manner, is always urged toward a direction to close the opening windows 16a and 16b by the torsion spring 46 showing one example of an elastic body loosely fit in the projecting shaft 25 which is loosely inserted through its swinging hole 17f. One end of this torsion spring 46 is made to be seated on an inner surface of the inner concave portion 23b and the other end is engagingly stopped by the spring receiving tab 17e of the opening and closing door 17. Therefore, when an external force acting on the opening and closing door 17 is only a spring force by the torsion spring 46, the lock nail 17c climbs over the lock tab 44 to enter into the notch 44a by the spring force and its one nail portion becomes a state of being in contact with an inner edge of the engagingly stopping portion 44b.

Meanwhile, as for materials for the upper shell 13 and the upward lower shell plate 14a and the downward lower shell plate 14b, for example, ABS resin (acrylonitrile·butadien·styrene resin) is suitable, but other synthetic resin such as HIPS (high impact proof polystrene), PP (polypropylene) and the like can be used. Further, as materials for the opening and closing door 17 and the plate spring body 43, for example, a stainless steel plate and the like are suitable, but other metal-made plate materials can naturally be applied and further, synthetic resin such as HIPS or the like is also used.

Before the disk cartridge 10 having the above-mentioned arrangement is installed in the disk recording and reproducing apparatus, disk cartridge is placed in a state as shown in FIG. 4 and FIG. 5. That is, the opening and closing door 17 is in a state of completely closing the opening windows 16a and 16b with the spring force of the torsion spring 46, and the opening and closing door 17 is in a state of being immovably locked by the first and the second lock mechanisms.

By inserting the disk cartridge 10 in such a state in the disk recording and reproducing apparatus, locked states of the first and second locking mechanisms are released by the first and second locking mechanisms provided in the disk recording and reproducing apparatus and thereafter, the opening windows 16a and 16b are opened by swinging the opening and closing door 17 by a door opening mechanism.

First of all, when the disk cartridge 10 is inserted in the disk recording and reproducing apparatus, a locked state of a first lock releasing mechanism is released by a first lock releasing mechanism. This first lock releasing mechanism is, for example, arranged by having an arm member to outwardly swing the lock arm 40, and by swinging the lock arm 40 from the state shown in FIG. 4 and FIG. 5 in an anti-clockwise direction by its arm member against the spring force of the torsion spring 41, the lock nail 40b of the lock arm 40 moves away from the lock pin 31 of the opening and closing door 17, thereby releasing the locked state by the first locking mechanism.

Concurrently with or before and after this, the second lock releasing mechanism releases the locked state by the second lock mechanism. This second lock releasing mechanism is, for example, supposed to have an arrangement in which to have the above-mentioned operating pin 48 and is brought into operation with this operation pin 48 entering into the guide channel 20 provided on one side of the disk cartridge 10. When this operating pin 48 enters into the guide channel 20 and rides on the inclining plane 45a of the input tab 45, because, until then, both ends of the plate spring body 43 are in a state of having been lifted up by being supported at three points by the action of an electric tape 43b of the plate spring body 43, the lock tab 44 side of the plate spring body 43 is elastically deformed downward by an insertion force of the operating pin 48 in FIG. 11. As a result, the lock tab 44 slips out downward from between the lock nails 17c, thereby releasing the locked state by the first locking mechanism.

As a result, two locked states of the opening and closing door 17 are released, but because the opening and closing door 17 is urged in a direction to close the opening windows 16a and 16b by the torsion spring 46, the opening and closing door 17 can not be moved in this situation. Then, next, the opening and closing door 17 is swung by a door opening mechanism. This door opening mechanism is, for example, arranged by comprising a pressuring-down member capable of moving the opening and closing door 17 by pressuring down the lock pin 31 against the spring force of the torsion spring 46. Then, by pressuring down the lock pin 31 by the pressuring-down member of this door opening mechanism and by swinging the opening and closing door 17 from a state as shown in FIG. 4 and FIG. 5 to a state as shown in FIG. 6 and FIG. 7, the opening windows 16a and 16b are completely opened.

Contrary to this, when the disk cartridge 10 is taken out from the disk recording and reproducing apparatus, the above-mentioned first and second lock releasing mechanisms and the door opening mechanism act together in a converse direction, thereby automatically swinging the opening and closing door 17 in the inverse direction, and the opening windows 16a and 16b are closed with this opening and closing door 17. That is, for example, when the pressing force of the lock pin 31 is released by the pressuring-down member of the door opening mechanism and is put in a free state, the opening and closing door 17 swings to shift its position from the state as shown in FIG. 6 and FIG. 7 to the state as shown in FIG. 4 and FIG. 5 by the spring force of the torsion spring 41 which acts on the arm tab 17b, and a former state in which the opening windows 16a and 16b are closed is restored.

When the operating pin 48 of the second lock releasing mechanism retreats in a link motion with this, because the plate spring body 43 has an elastic deformation released and reverts to a former state, its lock tab 44 enters into the lock nails 17c of the opening and closing door 17. As a result, a first stair locked state of the opening and closing door 17 by the first lock releasing mechanism is secured. In the same way as this, the lock arm 40 is returned to a former state by the spring force of the torsion spring 41 as regulation of the lock arm 40 by the arm member of the first lock releasing mechanism is released. As a result, the lock nail 40b of the lock arm 40 is engaged with the lock pin 31, which makes it possible to secure a second step locked state of the opening and closing door 17 by the first locking mechanism.

In this manner, according to the disk cartridge 10 concerning the first embodiment, because the opening and closing door 17 is so structured to be swung along a plane of-the plane portion by placing the opening and closing door 17 between the upper and lower shell plates 14a and 14b of the lower shell 14 in which the opening windows 16a and 16b of the cartridge housing 12 are provided, it became possible to reduce as much as possible the gap formed between the cartridge housing 12 and the opening and closing door 17. Therefore, it became possible to effectively restrain minute dust from entering into the cartridge housing through the gap between the cartridge housing 12 and the opening and closing door 17. Further, it is possible to beforehand prevent an accident in which a user erroneously opens the opening and closing door 17 as the opening and closing door 17 is accommodated in the lower shell 14. And further, because there are provided dual lock mechanisms in the opening and closing door 17, it is possible to surely prevent an accident in which a user erroneously opens the opening and closing door 17.

A disk cartridge 50 according to a second embodiment of the present invention is, as shown in FIG. 12 through FIG. 15, one in which an opening and closing door 57 is exposed outside a cartridge housing 52. This disk cartridge 50 comprises: a cartridge housing 52 which is arranged by superposing a pair of an upper shell 53 and a lower shell 54, an optical disk 51 which is accommodated capable of rotating freely in a disk accommodating room 55 formed in this cartridge housing 52, the opening and closing door 57 capable of opening and closing an opening window 56 formed in the lower shell 54 and the like.

The upper shell 53 is made up of a plate shape body comparatively thin in thickness with a front half being of a semi-circular shape and a rear half being of a square shape, and a screw shaft portion 58 projecting downward is provided nearly in the middle portion of its inside face. Also, the lower shell 54 is made up of a plate shape body as a plane portion having an appropriate thickness with a front half similarly being of a semi-circular shape and a rear half being of a square shape, and a disk accommodating room 55 consisting of a circular shaped concave portion is provided on its inside face. Then, guide channels 60 and 61, which play a role of positioning when it is loaded on the disk recording and reproducing apparatus and of preventing erroneous insertion and the like, are provided on both side portions in a widewise direction of the lower shell 54 extending in a front to back direction.

Further, a circular channel 59 concentric with this disk accommodating room 55 is provided outside the disk accommodating room 55 of the lower shell 54. This circular channel 59 is so set as to start in the neighborhood of one guide channel 60 and to cover nearly ¾ of a circumference of the disk accommodating room 55 and an arm accommodating concave portion 63 in which an engagingly stopping arm 62 showing one concrete example of an engagingly stopping member is accommodated capable of swinging freely is contiguously connected to its starting edge portion. A supporting pin 63a is projectingly provided in this arm accommodating concave portion 63 and a base end of the engagingly stopping arm 62 is supported by this supporting pin 63a capable of swinging freely.

The engagingly stopping arm 62 comprises: an engagingly stopping nail 62a provided at its tip end and an input projection 62b which is set between this engagingly stopping nail 62a and a hole for the supporting hole 63a. The engagingly stopping nail 62a and the input projection 62b of the engagingly stopping arm 62 are projected in the same direction and are always urged toward the guide channel 60 side by a torsion spring 64 showing a concrete example of an elastic body. That is, a coil portion of the torsion spring 64 is loosely fit around the supporting pin 63a with one end being engagingly stopped by a spring receiving tab 63b in the arm accommodating concave portion 63 and the other end being seated on the engagingly stopping arm 62. This engagingly stopping arm 62 is set such that the engagingly stopping nail 62a and the input projection 62b face a continuously connection opening 65 which continuously connects the guide channel 60 with the arm accommodating concave portion 63. Then, there is a setting such that the input projection 62b projects into the guide channel 60 by a spring force of the torsion spring 64 while the engagingly stopping nail 62a is accommodated in the arm accommodating concave portion 63.

A ribbon shaped lock band 66 is accommodated capable of sliding freely in the circle channel 59 so that one end of the engagingly stopping arm 62 faces the engagingly stopping nail 62a. At one end in a longitudinal direction of this lock band 66, an engagingly stopping hole by which the engagingly stopping nail 62a is engagingly stopped capable of being mounted and demounted is opened, and in a nearly middle portion of a front half of the lower shell 54 which is an on-the-way portion in a longitudinal direction, the opening and closing door 57 is integrally fixed. A third locking mechanism for locking the opening and closing door 57 at a time of the opening window 56 being in a closed state is made up of this lock band 66, the torsion spring 64 and the engagingly stopping arm 62.

Also, in the front half of lower shell 54 opposing the fixed portion of the lock band 66 and the opening and closing door 57 is provided an operating concave portion 67 for carrying out swinging operation of the opening and closing door 57. This operating concave portion 67 is extended long in a lateral direction from a nearly middle portion of the front half of the lower half 54 to a portion reaching the other guide channel 61, and a notch portion 67a where the opening and closing door 57 passes capable of sliding freely is provided in a projected stripe opposing this, which is set between the disk accommodating room 55 and the circle channel 59.

Further, a hub hole 68 is opened in a central portion of the disk accommodating room 55 in the middle or the substantial center of the lower shell 54 and the opening window 56 which extends forward succeeding this hub hole 68 and nearly reaches the middle portion of the front half is provided. This opening window 56 and the hub hole 68 are made to be freely opened and closed by the opening and closing door 57 mounted on the lower shell 54.

This opening and closing door 57 is cross-sectionally U letter shaped and comprises a shutter piece 57a for opening and closing the opening window 56 and the hub hole 68, a peripheral tab 57b succeeding a peripheral edge of the shutter 57a and a base piece 57c which is so provided as to succeed the peripheral tab 57b and oppose the shutter piece 57a. At the base end of the shutter piece 57a of the opening and closing door 57 is provided a inserting hole 57d, and a part of the peripheral tab 57b is swelled so that a finger and the like can easily catch it. The base piece 57c of the opening and closing door 57 is disposed along an inner surface of the upper shell 53, and an operating pin 70 which projects to a shutter piece side is integrally provided in an inner peripheral end thereof.

Also, the optical disk 51 accommodated in the disk accommodating room 55 of the cartridge 52 comprises a disk portion 51a having a nut hole 71 at its center portion and a tube shaft portion 51b provided at the center portion on one surface of the optical disk portion 51a. The tube shaft portion 51b penetrates through the hub hole 68 of the lower shell 54 and the inserting hole 57d of the opening and closing door 57 to project to a lower surface side. Then, the shutter piece 57a is prevented from coming off by a ring shaped stopping ring 72 fixed at a tip end portion of the tube shaft portion 51b. Further, a nut member 73 is loosely fit in the nut hole 71 and a screw shaft portion 58 of the upper shell 53 is engaged with a screw portion provided on an inner peripheral surface thereof.

This nut member 73 comprises a head portion 73a for preventing itself from coming off the nut hole 71 and a slit 73b provided on an outer peripheral surface extending in parallel with the center of the screw hole. The operating pin 70 of the opening and closing door 57 is slidably inserted into the slit 73b of the nut member 73. Then, a chucking plate 74 consisting of an iron plate and the like for being installed on a turntable is fit in an inside of the tube shaft portion 51b covering the head portion 73a side of the nut member 73.

As for the materials of this optical disk 51, as similar to the case in the above-mentioned first embodiment, polycarbonate (PC) and the like are suitable, but it is possible to use not only other synthetic resin but also various kinds of other materials such as glass material, aluminum alloy and the like other than the synthetic resin. Also, as for the materials of the upper and lower shells 53 and 54, synthetic resin such as ABC resin, HIPS and the like are similarly suitable, but it is possible to use other synthetic resin but also other materials such as aluminum alloy and the like. Further, as for the materials of the opening and closing door 57, for example, stainless steel with excellent resistance to corrosion is suitable, but it goes without saying that not only aluminum alloy and the like but also synthetic resin can be used.

According to the disk cartridge 50 having such the arrangement, as shown in FIG. 12 and FIG. 13, when the opening window 56 is closed by the opening and closing door 57, the nut member 73 is pulled in an upward direction and the optical disk 51 is in a state of having been lifted. Therefore, the shutter piece 57a of the opening and closing door 57 is lifted by the tube shaft portion 51b of the optical disk 51 and the shutter piece 57a becomes a state of being placed in pressured contact with a lower surface of the lower shell 54. As a result, the gap between the shutter piece 57a and the lower shell 54 is made as small as possible, thereby making it possible to effectively restrain the minute dust from entering. Further, because the opening and closing door 57 is locked by the third locking mechanism, it is possible to beforehand prevent an accident in which a user erroneously opens the opening and closing door 57.

When the operation pin enters into one guide channel 60 and pushes down with pressure the input projection 62b of the engagingly stopping arm 62 by installing the disk cartridge 50 in the disk recording and reproducing apparatus while the opening and closing door 57 is in a state of being closed, the engagingly stopping arm 62 is pushed back toward the inside against the spring force of the torsion spring 64. As a result, the engagingly stopping nail 62a of the engagingly stopping arm 62 retreats inside and gets out of the engagingly stopping hole of the lock band 66, thereby releasing the lock by the third locking mechanism.

Then, when the opening and closing door 57 is swung into an opened state as shown in FIG. 14 from a closed state shown in FIG. 12 by operating the door opening mechanism, the opening window 56 is completely opened. Then, the operating pin 70 provided in the base piece 57c integrally swings according to the swing of the opening and closing door 57, thereby swinging the nut member 73 by the same angle. Compared with this, because the screw shaft portion 58 with which the nut member 73 is engaged is integrated with the upper shell 53, when the nut member 73 swings, the nut member 73 itself is guided by the operating pin 70 and relatively moves in a downward direction. As a result, with a descending action of the nut member 73, the optical disk 51 supported by its head portion 73a descends under its own weight by a descending amount of the nut member 73 and changes into a state as shown in FIG. 15.

In this state, the optical disk 51 is chucked by raising a turntable on the disk recording and reproducing apparatus side or the like. As a result, the optical disk 51 is integrated with the turn table in terms of a rotating direction, thereby making it possible to write (recording) and read out (reproducing) an information signal in and from the optical disk 51.

Contrary to this, when the disk cartridge 50 is taken out of the disk recording and reproducing apparatus, an opposite operation of the above-mentioned operation is carried out. Then, the opening and closing door 57 is swung in an opposite direction and the disk cartridge 50 changes from a state as shown in FIG. 14 and FIG. 15 to a state as shown in FIG. 12 and FIG. 13.

The same effect by the disk cartridge 10 concerning the first embodiment is obtained by the disk cartridge 50 according to the second embodiment.

Explanations have been made up to this point, but the -present invention is not limited to the above-mentioned embodiments. For example, in the above-mentioned embodiments, an example of using the optical disk as an information memorizing medium has been explained, but the present invention can be applied to magnetic disks such as an magneto-optical disk, a floppy disk and the like and other various kinds of information memorizing media. Further, in the above-mentioned embodiments, the example in which the present invention is applied to the dual purpose recording and reproducing disk recording and reproducing apparatus as an information memorizing medium has been given, but needless to say, the present invention can be applied to a disk memory apparatus capable of only either of recording and reproducing.

Also, in the above-mentioned embodiments, explanations have been made about the examples in which the opening windows 16 and 56 are provided in respective one plane portions of the cartridge housings 12 and 52, but the cartridge housing can be structured such that access can be simultaneously made from top and bottom of the cartridge housing by boring opening windows on plane portions of both surfaces. Further, the use of the torsion spring as an elastic body has been explained, but needles to say, it is possible to use not only plate spring and other spring materials but also rubber state elastic bodies such as rubber or synthetic resin akin to this and the like. In this manner, the present invention can be subjected to various changes within a range of departing its gist.

As have been explained in the above, according to the present invention, because there is provided the arrangement in which the opening and closing door is swung along a plane of the plane portion of the cartridge housing, it is possible to reduce the gap between the opening and closing door and the cartridge housing as small as possible, and hence, it is possible to effectively restrain the minute dust from entering into the cartridge housing through the gap between the cartridge housing and the opening and closing door. Further, because the opening and closing door is locked by the locking mechanism when the opening windows are closed, such an effect can be obtained that an occurrence of an accident in which a user erroneously opens the opening and closing door can be beforehand prevented.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed:

1. A disk-shaped information memorizing medium cartridge, comprising:
   a cartridge housing including a disk-shaped information memorizing medium accommodating room formed by superposing a pair of shells;
   a disk-shaped information memorizing medium arranged for rotating freely in said disk-shaped information memorizing medium accommodating room;
   an opening window formed in one shell of said pair of shells, said opening window exposing an information memorizing surface of said disk-shaped information memorizing medium; and
   an opening and closing door installed in said one shell of said pair of shells for swinging freely and for opening and for closing said opening window when swinging within a plane of said one shell of said pair of shells as a guide, wherein said plane of said one shell is substantially parallel to said information memorizing surface of said disk-shaped information memorizing medium rotatably arranged in said disk-shaped information memorizing medium accommodating room, wherein
   a lock mechanism is provided in said cartridge housing for locking said opening and closing door at a position where said opening window is closed, and
   said lock mechanism comprises a first lock mechanism to engagingly stop a lock pin provided at a first end of said opening and closing door and a second lock mechanism to engagingly stop a lock nail provided at a second end of said opening and closing door.

2. The disk-shaped information memorizing medium cartridge as set forth in claim 1, wherein
   one shell of said pair of shells is comprised of a pair of respectively superposed shell plates, a plurality of opening windows are respectively provided in said pair of shell plates to oppose each other, and said opening and closing door is interposed between said pair of shell plates for swinging freely.

3. The disk-shaped information memorizing medium cartridge as set forth in claim 1, wherein said lock pin is exposed outside said cartridge housing, a lock arm is attached to said cartridge housing for swinging freely and an elastic body urges said lock arm toward a side of said lock pin.

4. The disk-shaped information memorizing medium cartridge as set forth in claim 1, wherein said second lock mechanism comprises an elastic member provided with a stopping tab for engagingly stopping said lock nail, and said elastic member is provided with an input tab projecting outside said cartridge housing.

* * * * *